July 26, 1932.  S. WHITWORTH ET AL  1,868,782

WELDING APPARATUS

Filed July 7, 1927    6 Sheets-Sheet 3

INVENTOR
LELAND E. LONG
STANLEY WHITWORTH
BY
ATTORNEY

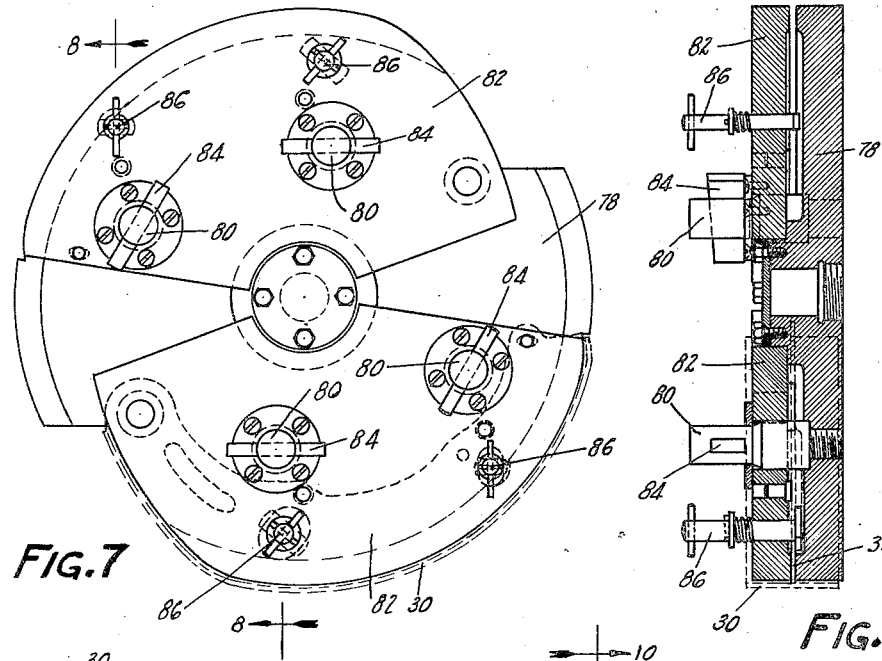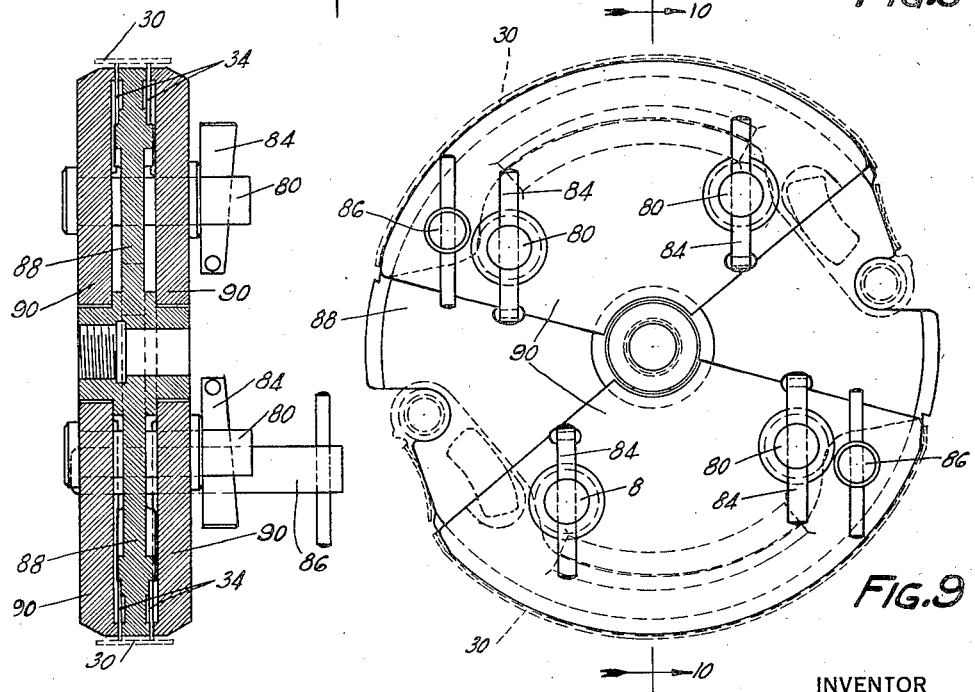

July 26, 1932.   S. WHITWORTH ET AL   1,868,782
WELDING APPARATUS
Filed July 7, 1927   6 Sheets-Sheet 5
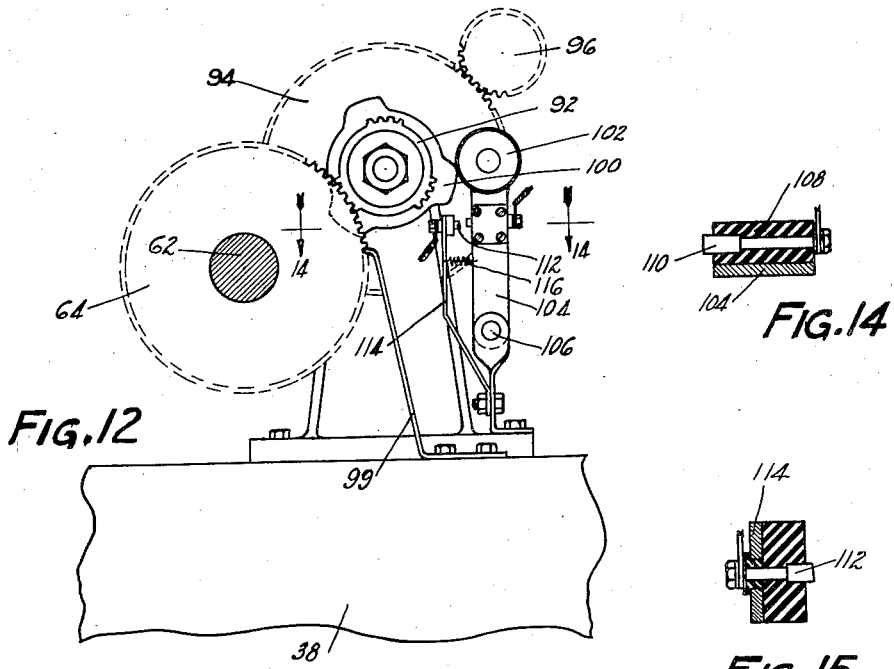
FIG.12
FIG.14
FIG.15
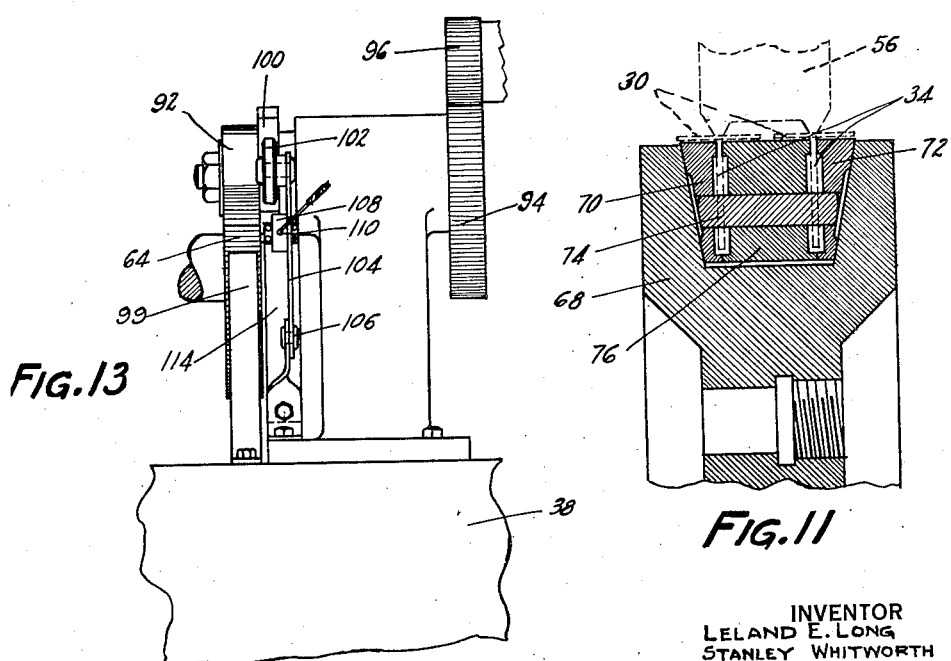
FIG.13
FIG.11
INVENTOR
LELAND E. LONG
STANLEY WHITWORTH
BY
ATTORNEY

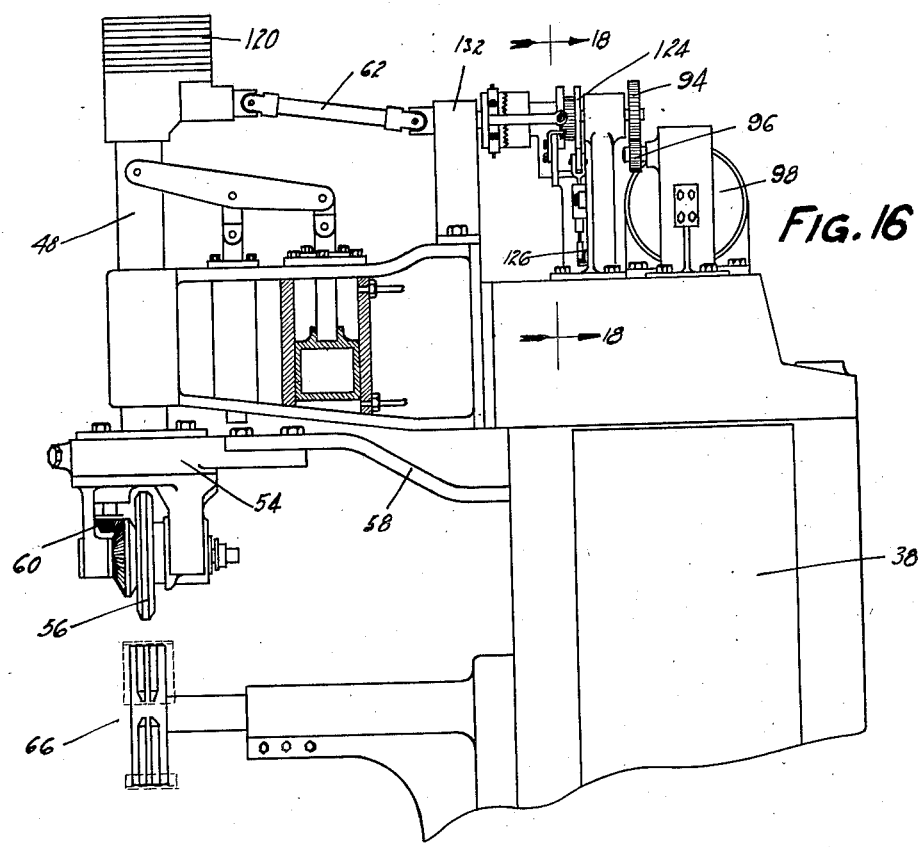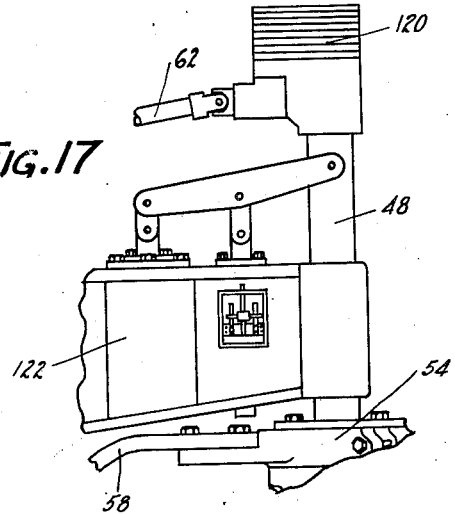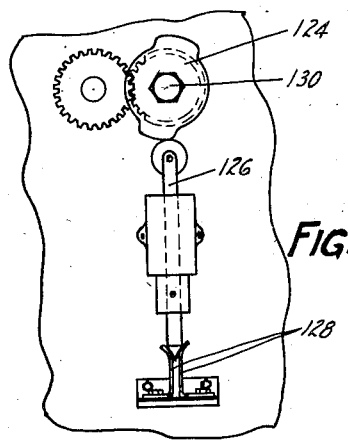

Patented July 26, 1932

1,868,782

UNITED STATES PATENT OFFICE

STANLEY WHITWORTH AND LELAND E. LONG, OF SOUTH BEND, INDIANA, ASSIGNORS TO BENDIX BRAKE COMPANY, OF SOUTH BEND, INDIANA, A CORPORATION OF ILLINOIS

WELDING APPARATUS

Application filed July 7, 1927. Serial No. 203,928.

This invention relates to welding, and is illustrated as embodied in a novel machine for welding together webs and rims to form articles such as brake shoes. An object of the invention is to provide a relatively simple apparatus, preferably power-driven, in which the work of loading and unloading is reduced to a minimum.

One feature of novelty relates to the arrangement of the apparatus so that one electrode grips the web, and thus carries both the web and the rim mounted on it, while the other engages the rim opposite the edge of the web, and has the double function of pressing the rim forcibly against the edge of the web while the weld is being made, and of passing the current through the rim and web to make the weld. We prefer that one of the electrodes, for example the one engaging the rim, be driven by power to feed the web and rim along as they are being welded together.

Another important feature of novelty relates to the arrangement of the lower electrode or turret in sections, preferably of such form that the pressure on the web, through the rim from the upper electrode, urges the sections forcibly toward each other to grip the web more firmly. Where there are two webs, as in forming a shoe having two stiffening webs or in welding two shoes at once, there is a section between the webs in supporting engagement with both of them.

In the arrangement illustrated, the sections engaging the outer faces of the webs have inclined outer wedge surfaces, and the assembly including the sections with the web and other parts of the shoe is placed in an elongated depression in the outer face of the turret or electrode, which depression is wedge-shaped in cross-section. Thus the pressure on the web wedges the outer sections firmly together.

Whether or not constructed exactly as described above, we consider it important to provide the sections with means preventing the pressure on the web from forcing the web downwardly between them, thus positively preventing the rim from engaging the lower electrode and shorting the circuit.

The above and other objects and features of the invention, including various novel combinations of parts and desirable particular constructions, will be apparent from the following description of the illustrative embodiments shown in the accompanying drawings, in which.

Figure 1:
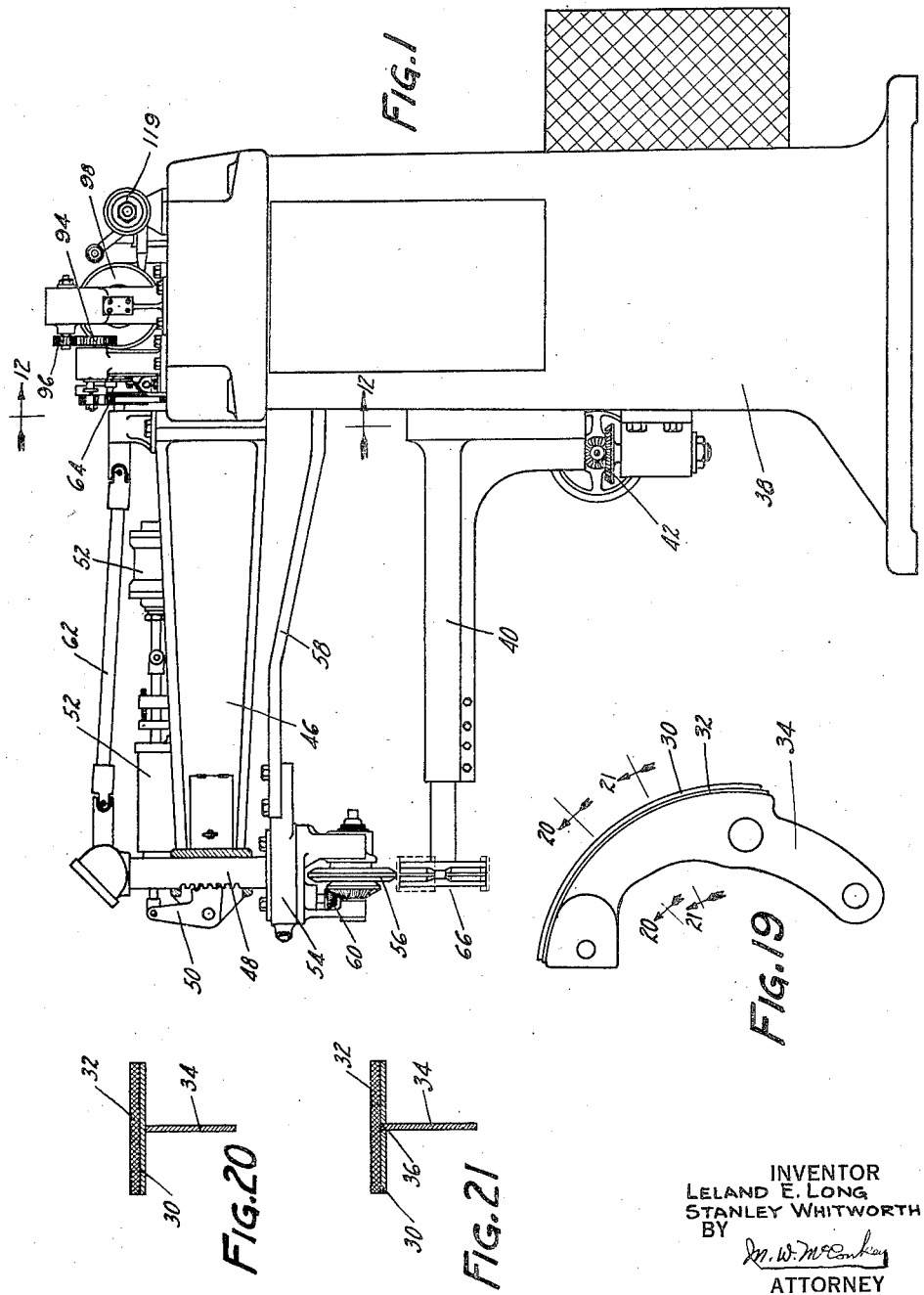
Figure 1 is a side elevation of a complete welding apparatus embodying the invention.
Figure 2:
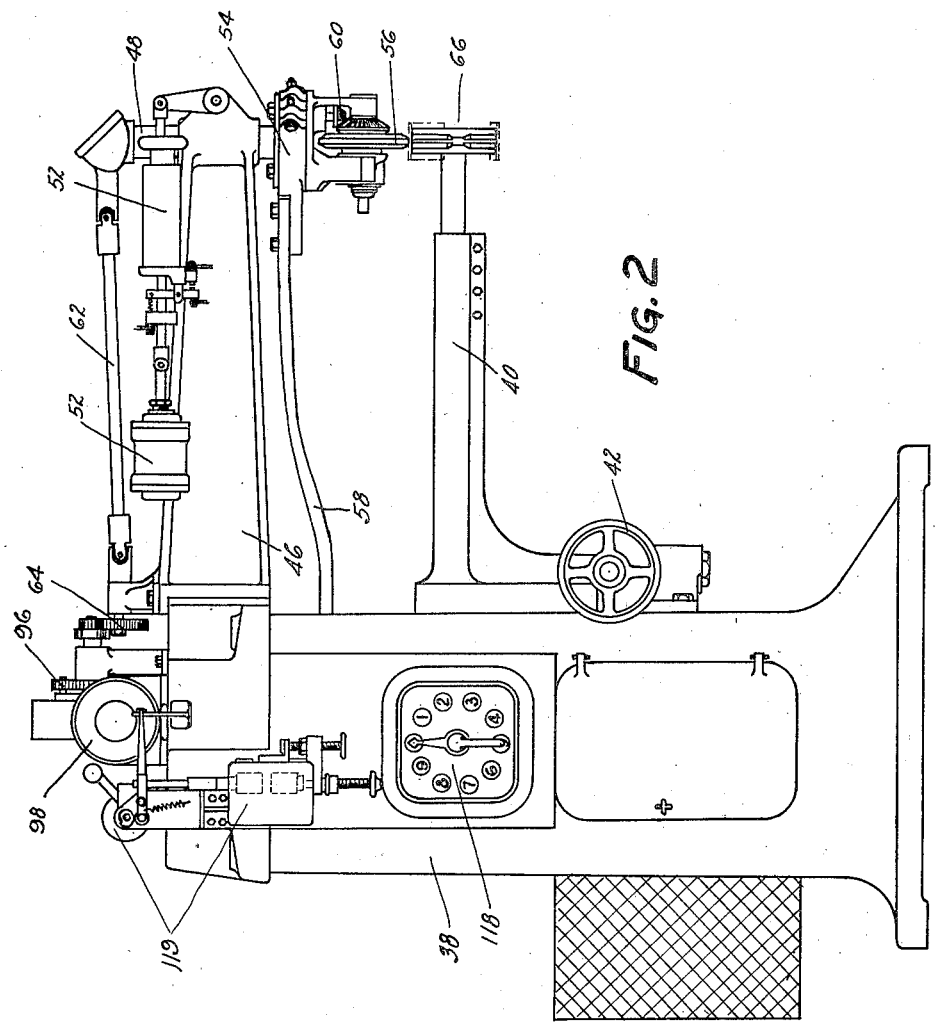
Figure 2 is a side elevation of the apparatus, showing the opposite side from Figure 1.
Figure 3:
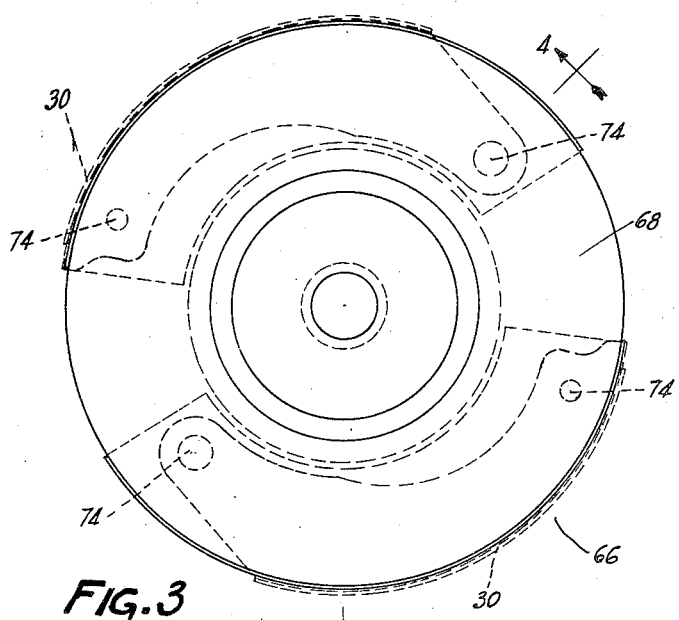
Figure 3 is an elevation of the lower electrode or turret, looking in the direction that would be a front elevation in Figure 1 or Figure 2.
Figure 6:
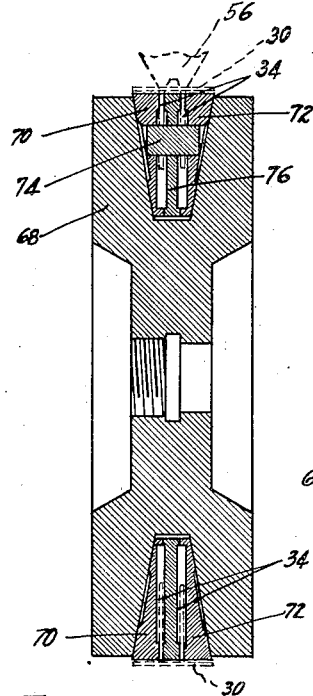
Figure 5:
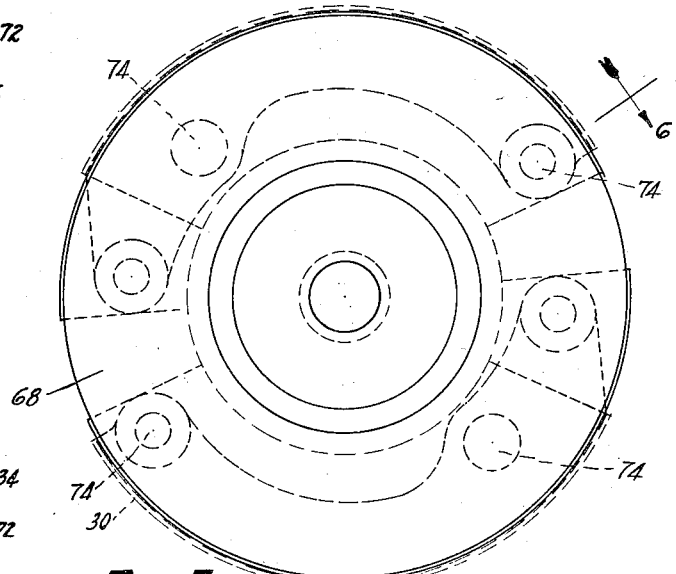

Fgure 4 is a section through the turret or lower electrode on the line 4—4 of Figure 3;

Figure 5 is a side elevation of a similar electrode arranged for welding two webs to the same rim;

Figure 6 is a section through the electrode of Figure 5, on the line 6—6 of Figure 5;

Figure 7 is an elevation of a third form of lower electrode or turret;

Figure 8 is a section through this electrode on the line 8—8 of Figure 7;

Figure 9 is an elevation of a fourth form of lower electrode or turret, generally similar to that of Figure 7, except that it is for welding two webs to the same rim;

Figure 10 is a section through this electrode, on the line 10—10 of Figure 9;

Figure 11 is a section corresponding to Figure 6, but showing the welding of the two webs to different rims, to make two shoes at once;

Figure 12 is a detail view, on a larger scale than Figure 1 and looking in the direction of the arrows 12—12 in Figure 1, of the driving and timing mechanism;

Figure 13 is a side elevation of the parts shown in Figure 12;

Figures 14 and 15 are respectively sections, on the line 14—14 of Figure 12, through the two contacts of the timing mechanism;

Figure 16 is a side elevation corresponding to part of Figure 1, but showing a modification;

Figure 17 is a partial side elevation, looking in the opposite direction from Figure 16, and showing part of the mechanism;

Figure 18 is a partial section on the line 18—18 of Figure 16, showing the timing mechanism;

Figure 19 is a side elevation of the finished brake shoe; and

Figures 20 and 21 are respectively sections through the shoe on the lines 20—20 and 21—21 of Figure 19.

One form of brake shoe welded by our novel apparatus is shown in Figures 19–21, and includes a rim 30, to which the lining 32 is riveted or otherwise secured, and which is reinforced by a stiffening web 34 having its outer edge welded to the inner face of the rim 30.

Preferably web 34 has lugs 36 projecting through openings in rim 30; there may be one lug 36 at each end of web 34 and, if desired, one or more between the ends. In the finished shoe, lugs 36 take the shear tending to separate rim 30 lengthwise from web 34. In manufacturing the shoe, rim 30 is held by lugs 36 in assembled relation with respect to web 34, and is accurately positioned with respect to the web by those lugs, until the rim and web are welded together.

The welding apparatus of Figures 1–4 includes a suitable base or pedestal 38, on which a lower supporting arm 40 may be adjusted vertically by the usual mechanism 42. A novel electrode carried by this arm is supplied with electric current through a suitable flexible conductor.

At the top of the apparatus is another supporting arm 46, in the outer end of which is a vertically-slidable plunger 48, raised and lowered by a rack 50 operated by air cylinders 52 controlled in any desired way by the operator, for example by manipulating a valve. Plunger 48 carries a head 54 with a rotatable electrode 56, which is supplied with current by a flexible conductor 58, and which is driven by a bevel gear 60 driven by suitable gearing inside plunger 48 operated in turn by a flexibly-mounted shaft 62. Shaft 62 in turn is driven by a spur gear 64.

Figure 4:
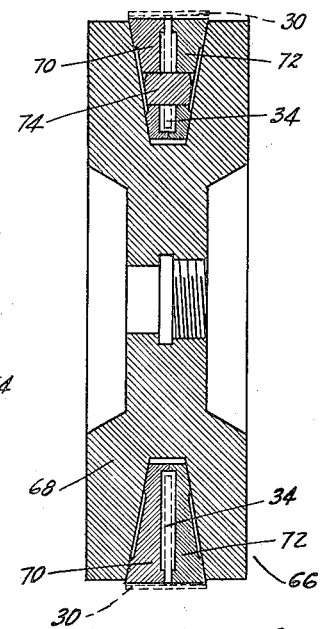

In the arrangement of Figures 1–4, the web and rim to be welded are carried by a novel electrode or turret, indicated generally at 66, and shown in detail in Figures 3 and 4. Turret 66 is rotatably mounted on arm 40, and is driven by the electrode 56 through its action on the rim and web of the brake shoe.

As best appears in Figures 3 and 4, the turret or lower electrode preferably includes a carrier 68, formed in its outer face with an elongated socket or groove which is wedge-shaped in cross-section, and which in the illustrated construction extends entirely around the carrier.

Within this groove are arranged two sections 70 and 72, having adjacent faces gripping the web 34 between them, and having inclined outer faces in wedging engagement with the walls of the groove. Web 34 carries its rim 30 with it, there being a clearance between the inner face of rim 30 and the outer faces of sections 70 and 72, which clearance is preferably approximately equal to the thickness of the rim 30.

It will be seen that electrode 56 engages the outer face of rim 30 opposite the edge of web 34, and presses downwardly with its own weight as well as being forced yieldingly downward by air pressure, and that this downward pressure wedges sections 70 and 72 forcibly toward each other firmly against the opposite sides of web 34.

As electrode 56 rotates, it turns the lower electrode or turret to feed the web and rim past the electrode 56. Sections 70 and 72, with a web and rim, are assembled by the operator and placed in the groove of carrier 68, which is then turned by the operator until the end of rim 30 is engaged by the electrode 56, after which the feeding is automatic. When the welding is finished, the shoe and sections 70 and 72 may be removed by the operator, or after they pass the vertical they will fall out of the carrier 68.

We consider it important to provide sections 70 and 72, or their equivalents, with means such as keys 74 passing through openings in the web 34, and which prevent the downward pressure on rim 30 from pushing web 34 downwardly between sections 70 and 72. This preserves at all times a predetermined clearance between the lower face of rim 30 and the outer faces of sections 70 and 72.

Where the sections grip the web clear at their outer faces, as illustrated in Figure 4, this clearance is preferably substantially equal to the thickness of web 30, thus giving the general effect of welding together two sheets of equal thickness.

As shown in Figures 5 and 6, when two webs 34 are to be welded to the same rim, a third section 76 is arranged between the two webs. Figure 11 shows how this apparatus may be used with a double electrode 56 to weld two webs 34 to two different rims 30, thus welding two shoes at once.

In Figures 7 and 8 is shown another form of turret or electrode, including a rotatably-mounted section 78 carrying posts 80 passing through openings in a cooperating section 82, there being wedges 84 in posts 78 for forcing the two sections toward each other to grip a web 34. Plungers 86 carried by sections 82 engage openings in the web 34 to prevent it from being pushed downwardly between sections 78 and 82 by the electrode 56.

In Figures 9 and 10, there are similar parts for the double-web construction, a central section 88, corresponding to section 78, being rotatably mounted and cooperating with sections 90 corresponding to sections 82. In the illustrated arrangement, one of the posts 80 is arranged to replace one plunger 86, for each shoe, by engaging the inner edges of the webs 34.

We prefer to drive the turret, with the web and rim, intermittently, and to pass current between the two electrodes only during the pauses in the feeding, thus securing the rim to the web by a series of spaced spot-welds. The timing mechanism for this purpose is shown in Figures 12–15.

In this particular arrangement, gear 64 (which drives the electrode 56) is driven at predetermined intervals by spaced sets of teeth on a mutilated pinion 92 driven by a gear 94 meshing with a pinion 96 constantly driven through suitable reduction gearing by an electric motor 98. A spring pawl 99 holds gear 64 when it is not being driven.

On the same shaft with the mutilated pinion 92 is a timing cam 100 engaged by a cam roller 102 on a lever 104 pivoted at 106. Lever 104 carries a block of insulation 108 in which is one contact 110, the other contact 112 being carried by a stationary arm 114 (shown as made of resilient material such as spring steel). Contacts 110 and 112 are held together by a spring 116, except when separated by cam 100. Thus the current is sent through the rim and web only during the pauses in the feeding. The above-described switch may control the welding current directly, or through a suitable relay switch, but preferably controls the primary circuit of a coil or transformer, the secondary circuit of which furnishes the welding current passing between electrodes 56 and 66.

Suitable rheostats for the motor current and the welding current are provided, one of them being shown at 118. Suitable mechanism 119 for forming a seam weld may also be provided, but this forms no part of the present invention.

In the modification of Figures 16–18, plunger 48 is urged downwardly by a weight 120, thus giving uniform pressure on electrode 56 regardless of its vertical position, an air cylinder 122 being provided if desired to lift the plunger 48 and weight 120.

In this case, the timing mechanism is also somewhat different, the timing cam 124 operating a spring-lifted plunger 126 to depress its lower end to bridge two yielding contacts 128 to send the welding current through the rim and web. The timing cam 124 is on a shaft 130 driven by gear 94, the shaft 130 operating shaft 62 intermittently through a mutilated pinion (not shown) forming part of a set of transmission gears in a housing 132.

If desired, and if it is preferred to have the operator stand at the front of the apparatus, electrodes 56 and 66 may be turned at right angles, arm 40 being in that case forked to provide arms between which electrode 66 is rotatably mounted. Also, if desired, electrodes 56 and 66 may be water-cooled, by providing suitable passages in them for the circulation of cooling water.

While illustrative embodiments have been described in detail, it is not our intention to limit the scope of the invention to those particular embodiments, or otherwise than by the terms of the appended claims.

We claim:

1. Welding apparatus comprising, in combination, a sectional electrode arranged to support rim and web members another electrode arranged to engage the rim member immediately opposite its point of engagement with the web member, and electrical connections for passing current from one electrode to the other to weld the web and rim together.

2. Welding apparatus comprising, in combination, an electrode arranged to hold a flat web having a rim with one face engaging the edge of the web, another electrode arranged to engage the rim immediately opposite the edge of the web, and means for operating one of the electrodes to feed the web and rim past the other electrode.

3. Welding apparatus comprising, in combination, an electrode arranged to hold a flat web having a rim with one face engaging the edge of the web, another electrode arranged to engage the rim immediately opposite the edge of the web, means for operating the electrodes to feed the web and rim intermittently, and means for passing current during each pause in the feeding, to secure the web and rim together by a series of spaced spot-welds.

4. Welding apparatus comprising, in combination, an electrode arranged to hold a flat web having a rim with one face engaging the edge of the web, another electrode arranged to engage the rim immediately opposite the edge of the web, the first electrode being movably supported and the second being mechanically operated to feed the rim and web, and means for passing current from one electrode to the other.

5. Welding apparatus comprising, in combination, a rotatable turret arranged to support the web and rim of a brake shoe and also serving as an electrode engaging said web, a rotatable electrode engaging the rim opposite the edge of the web, and mechanism for causing the rotation of the turret and the rotatable electrode to feed the web and rim past the rotatable electrode.

6. Welding apparatus comprising, in combination, a rotatable turret arranged to support the web and rim of a brake shoe and also serving as an electrode engaging said web, a rotatable electrode engaging the rim opposite the edge of the web, and power mechanism for rotating said latter electrode to turn the turret to feed the web and rim past the rotatable electrode.

7. Welding apparatus comprising, in combination, an electrode formed in sections to hold a web on the edge of which a rim is arranged, and another electrode engaging and urged against said rim opposite the edge of the web, said sections being constructed and arranged to be urged toward each other, to grip the web more firmly, by the pressure of the second electrode.

8. Welding apparatus comprising, in combination, an electrode formed in sections to hold a web on the edge of which a rim is arranged, and another electrode engaging and urged against said rim opposite the edge of the web, said sections being formed to prevent movement of the web between them and being constructed and arranged to be urged toward each other, to grip the web more firmly, by the pressure of the second electrode.

9. An electrode comprising an outer carrier having in its outer face an elongated socket wedge-shaped in cross-section, in combination with sections arranged to grip a web between them and which are formed to seat in said socket and be wedged toward each other by pressure on said web.

10. An electrode comprising an outer carrier having in its outer face an elongated socket wedge-shaped in cross-section, in combination with sections arranged to grip a web between them and which are formed to seat in said socket and be wedged toward each other by pressure on said web, said sections having means to prevent such pressure from forcing the web downwardly between the sections.

11. A turret comprising a rotatable carrier having in its outer face an elongated socket wedge-shaped in cross-section, in combination with a set of arcuate sections arranged to grip a web between them and which have straight web-engaging faces and inclined outer faces so as to seat in said socket and be wedged toward each other by pressure on said web.

12. A turret comprising a rotatable carrier having in its outer face an elongated socket wedge-shaped in cross-section, in combination with a set of arcuate sections arranged to grip a web between them and which have straight web-engaging faces and inclined outer faces, so as to seat in said socket and be wedged toward each other by pressure on said web, said sections having means to prevent such pressure from forcing the web downwardly between the sections.

13. An electrode comprising an outer carrier having in its outer face an elongated socket wedge-shaped in cross-section, in combination with a set of web-gripping sections adapted to seat in said depression, said set including a central section to be arranged between two substantially parallel webs in supporting engagement with both of them, and two outer sections having straight inner faces to engage the outer faces of the webs and having inclined outer faces to engage the walls of said depression.

14. An electrode comprising an outer carrier having in its outer face an elongated socket wedge-shaped in cross-section, in combination with a set of web-gripping sections adapted to seat in said depression, said set including a central section to be arranged between two substantially parallel webs in supporting engagement with both of them, and two outer sections having straight inner faces to engage the outer faces of the webs and having inclined outer faces to engage the walls of said depression, said sections having means to prevent pressure on the outer edges of the webs from forcing the webs downwardly between the sections.

15. Welding apparatus comprising, in combination, a turret holding a web and rim in assembled relation and rotatable in a vertical plane, a rotatable electrode above the turret arranged to engage the uppermost part of the rim opposite the edge of the web, and means for urging the electrode downwardly against said rim.

16. Welding apparatus comprising, in combination, a turret holding a web and rim in assembled relation and rotatable in a vertical plane, a rotatable electrode above the turret arranged to engage the uppermost part of the rim opposite the edge of the web, and a weight for urging the electrode downwardly against said rim.

17. Welding apparatus comprising, in combination, one electrode formed to hold the work, a second electrode arranged to engage work held by the first electrode, and driving means for moving the first electrode to carry the work past the second electrode.

18. Welding apparatus comprising, in combination, one electrode formed as a rotatable turret to hold the work, a second electrode arranged to engage work held by the first electrode, and driving means for rotating the first electrode about a fixed axis to carry the work past the second electrode.

19. Welding apparatus comprising, in combination, an electrode formed to hold one of two pieces of metal to be welded together, a second electrode arranged to force a second piece of metal against the first, means for passing a welding current between the two electrodes for uniting the pieces of metal, and driving mechanism for operating one electrode to cause the welding point to move along the work.

20. Welding apparatus comprising, in combination, an electrode formed to hold one of two curved pieces of metal to be welded together, a second electrode arranged to force a second curved piece of metal against the first, means for passing a welding current between the two electrodes for uniting the pieces of metal, and driving mechanism for rotating the first electrode about the center of curvature of said pieces of metal to cause the welding point to move along the work.

21. An electrode comprising a central section to be arranged between two substantially parallel webs in supporting engagement with both of them, and two outer sections having inner faces to engage the outer faces of the webs, in combination with means for forcing the outer sections toward each other.

22. An electrode comprising a central section to be arranged between two substantially parallel webs in supporting engagement with both of them, and two outer sections having inner faces to engage the outer faces of the webs, in combination with means for forcing the outer sections toward each other, said sections having means to prevent pressure on the outer edges of the webs from forcing the webs downwardly between the sections.

In testimony whereof, we have hereunto signed our names.

STANLEY WHITWORTH.
LELAND E. LONG.